(12) United States Patent
Lee

(10) Patent No.: US 7,261,227 B2
(45) Date of Patent: Aug. 28, 2007

(54) LUGGAGE RACK APPARATUS

(76) Inventor: Kuon Jen Lee, c/o Susana E. Liberman, Moldes 4186, Buenos Aires (AR) 1429

( * ) Notice: Subject to any disclaimer, the term of this patent is extended or adjusted under 35 U.S.C. 154(b) by 312 days.

(21) Appl. No.: 10/798,788

(22) Filed: Mar. 11, 2004

(65) Prior Publication Data

US 2005/0116001 A1    Jun. 2, 2005

(30) Foreign Application Priority Data

Dec. 3, 2003   (AR) ................. 030104751

(51) Int. Cl.
  *B62J 7/00*  (2006.01)
  *B60J 9/00*  (2006.01)
(52) U.S. Cl. ............... 224/429; 224/431; 224/440
(58) Field of Classification Search ............... 224/429, 224/428, 431, 440
  See application file for complete search history.

(56) References Cited

U.S. PATENT DOCUMENTS

| | | | | |
|---|---|---|---|---|
| 3,937,374 A | * | 2/1976 | Hine, Jr. ............... | 224/430 |
| 4,258,870 A | * | 3/1981 | Edelson ............... | 224/454 |
| 5,251,796 A | * | 10/1993 | Shelhart ............... | 224/454 |
| 5,722,117 A | * | 3/1998 | Nielsen ............... | 16/428 |
| 6,029,875 A | * | 2/2000 | Johnston ............... | 224/417 |

* cited by examiner

*Primary Examiner*—Nathan J. Newhouse
*Assistant Examiner*—Lester L. Vanterpool
(74) *Attorney, Agent, or Firm*—William B. Ritchie

(57) ABSTRACT

A luggage rack and removable block with anti-theft lock for two-wheeled vehicles. The main body has two rigid material rods descending at two consecutive angles and with opposite openings of about 45° each, towards the back of the vehicle over the back wheel, at the upper and distal ends of the back wheel. Two washers are provided as appropriate fixing elements and the back ends are connected to a rigid material rectangular body which in turn provides the necessary supporting elements for saddlebags with a rigid material tubular handle and for a rectangular bag to be located on top of the arrangement. On both sides of the rigid rectangular body, two V-shaped rigid rods are provided with two rigid washers which serve as fastening elements that are connected to the axle of the back wheel of the vehicle. On both sides of the upper surface of the rigid material rectangular body, respective internal and external semicircular moldings are located as housings for the rigid material tubular handles of the saddlebags, and for the rigid material tubes located on the lower surface of the upper rectangular bag. Having located the fixing elements in their housings, they are shackled by the longitudinal passage to body of the vehicle and of the arrangement from the back to the front by a U-shaped rigid material rod with a cylindrical lock with a key.

4 Claims, 3 Drawing Sheets

LUGGAGE RACK APPARATUS

This application claims benefit of Argentine Patent Application Ser. No. 030104751, filed Dec. 3, 2003, pursuant to 35 USC §119.

BACKGROUND OF INVENTION

1. Field of the Invention

This invention relates to luggage racks, particularly lockable units adapted for two wheeled vehicles such as bicycles.

2. Description of the Related Art

Two-wheeled vehicles, primarily bicycles, for personal transport, entertainment and sport are very well known and accepted. Additionally, multiple applications proposed for the same are emphasized in order to make them more convenient for different kinds of useful activities and thus achieving a greater yield and comfort for the vehicle.

When these kinds of vehicles are used for long ridings in country zones or when they are used to transport various articles, it is very useful to apply devices in order to increase both the rider's and luggage security. Thus a great number of such devices are well known in the art which, using different application methods, accomplish the same objective.

European Patent No. EP05927886 discloses an arrangement having a luggage rack over the back wheel fastened to the saddle by two side hooks and the other end thereof that is fastened to the axle of said wheel adds two side racks.

European Patent No. EP0440052 teaches a luggage rack arrangement with a rigid metal rod attached to the structure and frame of the vehicle which, when placed while the vehicle is being used, keeps luggage in place. This arrangement, by means of a lock at its end functioning as a retainer, serves as an impediment to theft.

German Patent DE4232806 discloses a security device for bicycles and consists of a V-shaped lock held by three mounts attached to the luggage rack located over the back wheel. It is locked with holes therethrough that enable the device to adjust it to any portion of the V-shaped rod.

German Patent DE4226008 provides an arrangement for bicycles, especially mountain bikes, consisting of a luggage rack located at the back of the rider's saddle fastened to the vehicle by a longitudinal rod fastened to the saddle base. This rod installs onto the luggage rack telescopic tubes. A locking mechanism that can be used to fasten the vehicle to firm physical elements is provided.

European Patent EP0763460 discloses a luggage rack to be placed at the back of a two-wheeled vehicle. It has got two articulated tubes with respective wheels at their ends that can be lowered when the vehicle is not being used so that they are placed on the floor. The upper part is fastened to the bicycle frame.

German Patent DE4102918 teaches a device comprising two longitudinal and parallel beams that are secured to both sides of the rear luggage rack of the bicycle and two transversal beams. The longitudinal beams are longer than the luggage rack in order to hold a lock at their ends. On the retainers of the luggage rack and secured by the device a small children's seat can be placed.

U.S. Pat. No. 4,666,071 discloses a device with two horizontal side beams the upper part of which is L-bent forming an inverted U in order to be secured on the back axle of the bicycle and is provided a lock with a key.

European Patent EP0440052 discloses a luggage rack for a bicycle having a U-shaped rod which at its free ends has a lock with a key. This lock is located at the back of the rider's saddle and the longitudinal rods relative to the vehicle frame.

U.S. Pat. No. 4,383,265 discloses a back luggage rack device for bicycles, having a base that rests behind the rider's saddle with two rods secured to the back axle of the vehicle, said rods may vary in their length. The device may be used in vehicles of various sizes. A U-shaped rod is located longitudinally relative to the base and the frame of the bicycle, its open end to the front where it has got a lock. The base can be extended and change its position.

German Patent DE4041460 teaches a luggage rack device with an exchangeable saddlebag. The saddlebag is mounted on the base at the back of the bicycle and has got a rod that secures it to the luggage rack with its handle as it has got a lock at one of its ends. The luggage rack base can vary in length and width.

Figure 1:
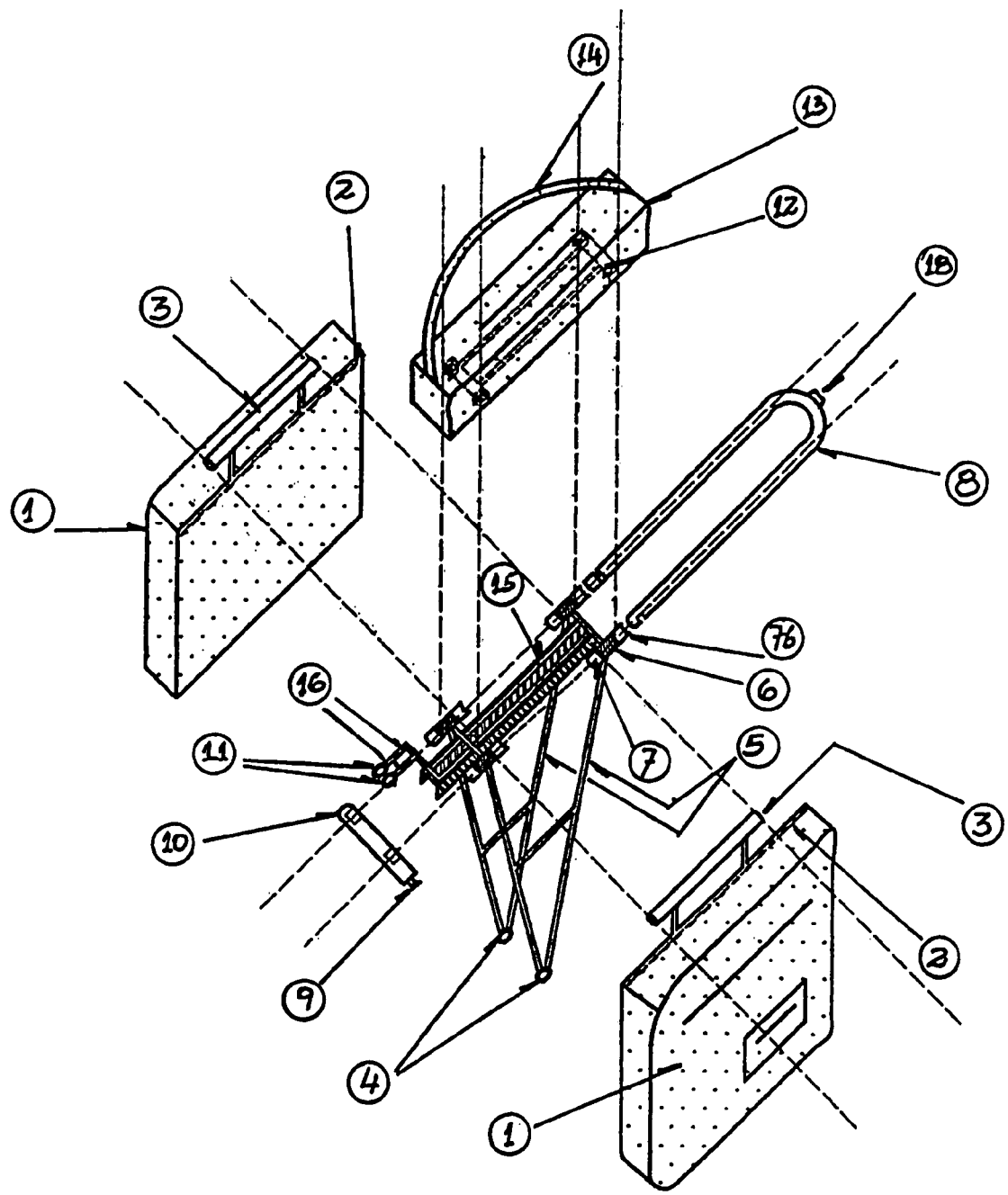
FIG. 1 illustrates an exploded view of the luggage rack in accordance with the invention.
Figure 2:
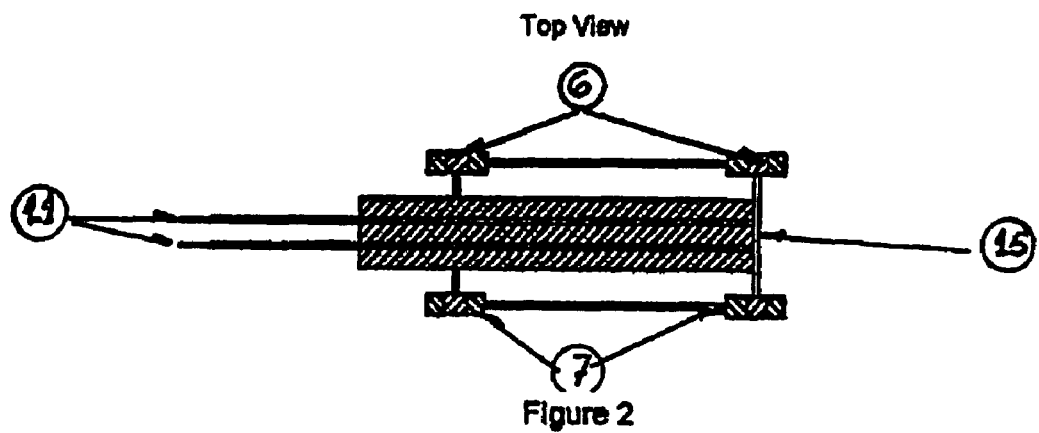
FIG. 2 illustrates a top perspective view.
Figure 3:
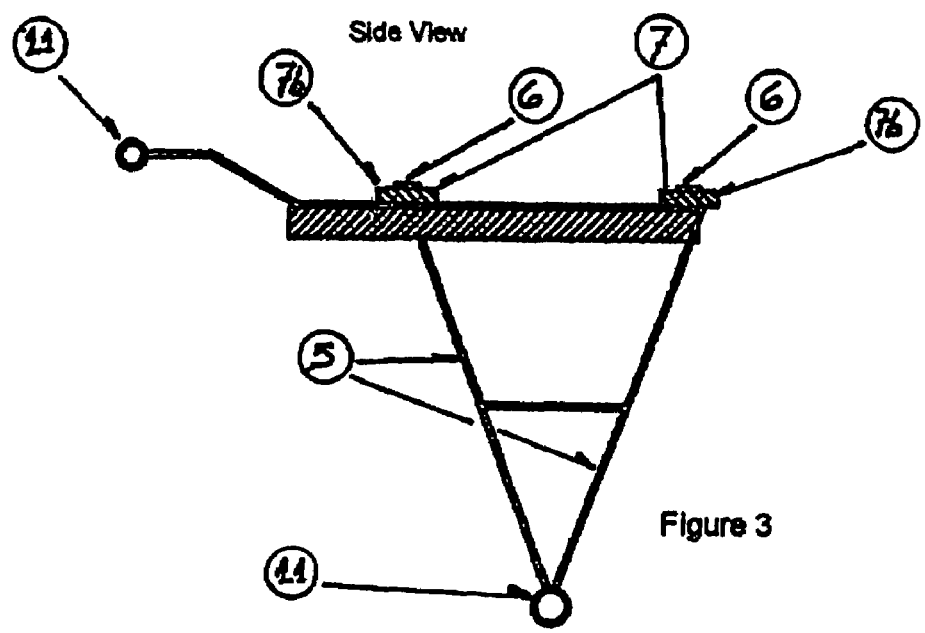
FIG. 3 illustrates a side perspective view.
Figure 4:
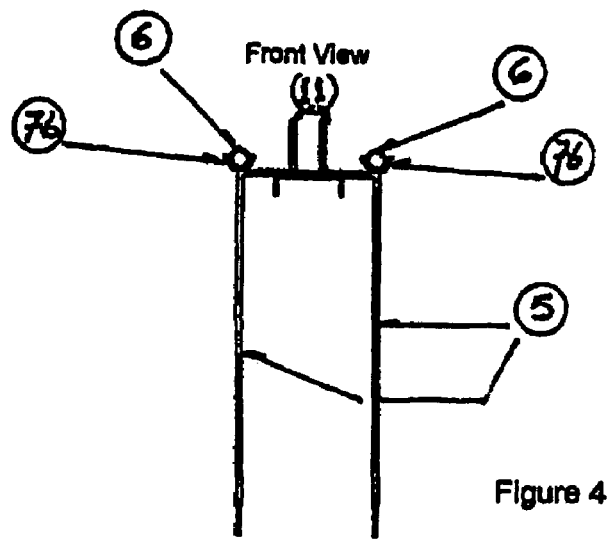
FIG. 4 illustrates a front perspective view.
Figure 5:
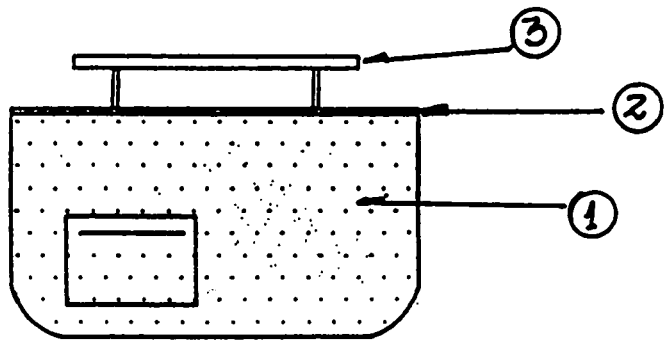
FIG. 5 illustrates a side perspective view of a saddlebag.
Figures 6, 7:
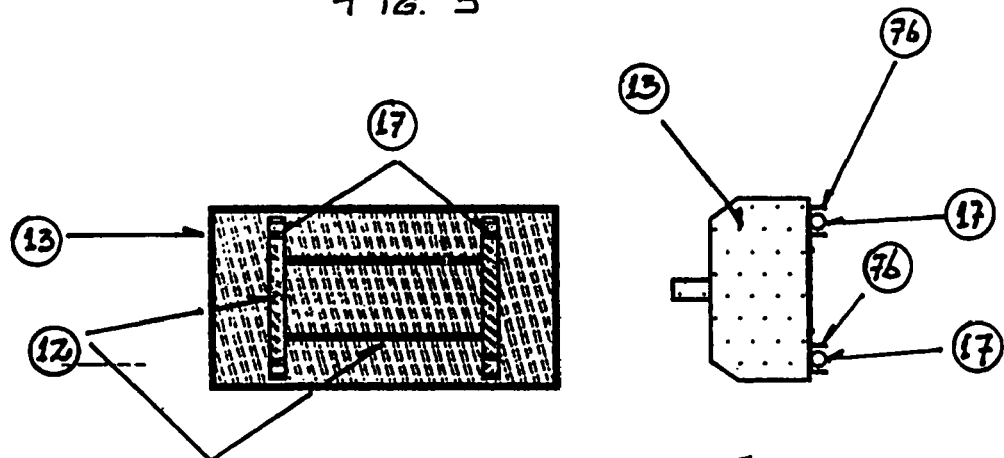
FIG. 6 illustrates a perspective view of the top bag base.
FIG. 7 illustrates a front perspective view of the top bag base.
Figure 8:
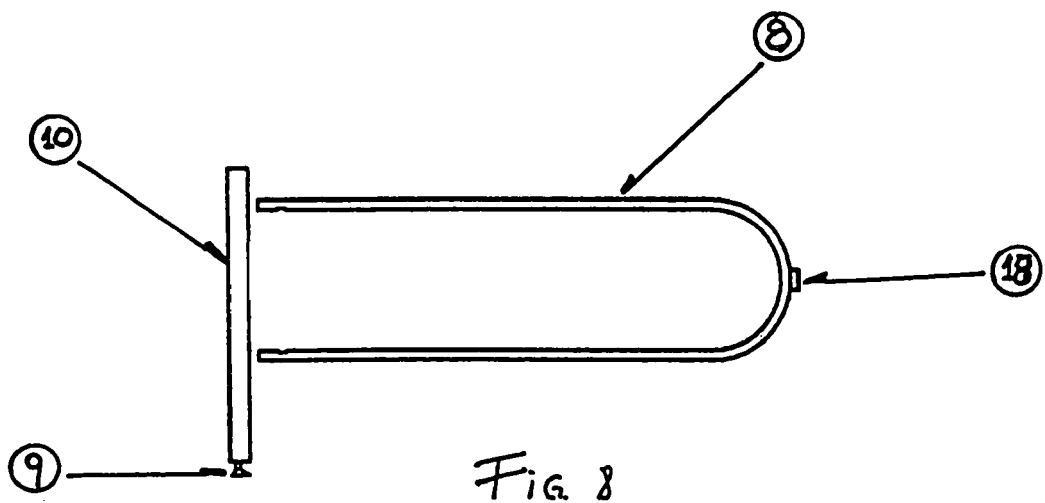
FIG. 8 illustrates a perspective view of the block and lock with a key.

In the figures described above, similar reference numerals indicate similar or corresponding parts, wherein number 1 indicates the saddlebag; number 2 indicates the rigid material tube; number 3 indicates a rigid material tubular handle; number 4 indicates rigid material lower washers; number 5 indicates rigid material rods; number 6 indicates a rigid material tube; number 7 indicates an internal rigid material semi-circular molding; number 7b indicates an external rigid material semi-circular molding; number 8 indicates a rigid material U-shaped rod; number 9 indicates a key; number 10 indicates a cylindrical lock; number 11 indicates rigid material upper washers; number 12 indicates rigid material metal rectangle; number 13 indicates a rectangular bag; number 14 indicates a strip; number 15 indicates a rigid material rectangular body; number 16 indicates rigid material rods; number 17 indicates rigid material tubes; number 18 indicates a reflecting element.

DESCRIPTION OF PREFERRED EMBODIMENT

The invention is a luggage rack and removable block with anti-theft lock for two-wheeled vehicles.

The main body comprises two rigid material rods descending in two consecutive angles and with opposite openings of approximately 45° each towards the vehicle back over its back wheel, at the upper and distal ends of the back wheel. Two washers are provided as appropriate fixing elements. The upper back ends are connected to a rigid material rectangular body which in turn provides the necessary supporting elements to saddlebags with a rigid material tubular handled. A rectangular saddlebag is located at the top of the arrangement. On both sides of the rigid rectangular body, two rigid V-shaped material rods are provided. At the bottom of the rods are two rigid material washers which serve as fastening elements connected to the vehicle back wheel axle.

On both sides of the rigid material rectangular body upper surface, respective internal and external semi-circular moldings are placed as a housing for rigid material tubular handles of the saddlebags and for the rigid material tubes located on the lower surface of the top rectangular bag. Once the fixing elements have been placed in their housings, they are shackled by the longitudinal passage to the vehicle body and the arrangement from back to front by a U-shaped rigid material rod with a cylindrical lock with a key.

The luggage rack comprises two rigid material parallel rods 16 which provide at their upper end two rigid material upper washers 11 which are fixed to the screw which in turn secures the saddle holder of two-wheeled vehicles. Rods 16 descend in two consecutive angles and with opposite openings of about 45° each, towards and over the vehicle back wheel. Under these rigid material rods 5, it is fixed by a heating process to a rigid material rectangular body 15 which constitutes the supporting base for the saddlebags on its side 1 and for the rectangular bag 13 on its upper surface.

The rigid material rods 5 constitute the support as described above as they are placed in its central part connected to the rigid material rectangular body 15 by a heating process, they descend at a 90° angle on both sides of the rigid material rectangular body 15 and their lower elements are joined by rigid material lower washers 4 designed to be fixed on both sides of the back wheel axle of the vehicle. At the 90° upper angles formed by the rods that shackle the saddlebags 1 the rigid material tubes 6 and the rigid material tubes 17, the U-shaped rigid material rod 8 being secured by a cylindrical lock 10.

The arrangement is supported on the two-wheeled vehicle frame by the rigid material upper washers 11 by the screw with a nut that normally fastens the saddle of the two-wheeled vehicle and the rigid material lower washers 4 by the nuts of the back wheel axle of the two-wheeled vehicle.

The illustrated embodiments of the invention are intended to be illustrative only, recognizing that persons having ordinary skill in the art may construct different forms of the invention that fully fall within the scope of the subject matter disclosed herein. Other features and advantages of the invention will be apparent from the descriptions hereof

What is claimed is:

1. An anti-theft luggage rack for two-wheeled vehicles comprising:
   supporting rods that connect said luggage rack to the two-wheeled vehicle;
   a rectangular body having supporting elements and connected to said supporting rods, wherein said supporting elements further comprise semicircular moldings separated by respective tubes;
   an upper rectangular bag attached to the supporting elements of said rectangular body wherein said upper rectangular bag also serves to cover a saddlebag locking arrangement;
   two opposing rigidly supported vertical side saddlebags, with each saddlebag having a rigid locking tubular handle, wherein said opposing side saddlebags are also attached to said rectangular body;
   a U-shaped rigid locking rod with a cylindrical lock and a key providing said saddlebag locking arrangement;
   wherein said upper rectangular bag and said opposing side saddlebags are attached to the supporting elements of said rectangular body via said U-shaped rigid rod by sliding said U-shaped then said anti-theft luggage rack can be locked into place on the rectangular body which is attached to the said support rods on the two-wheeled vehicle with said cylindrical lock and key.

2. The anti-theft luggage rack of claim 1 wherein said rectangular bag has a rigid internal base.

3. The anti-theft luggage rack of claim 2 wherein said rigid internal base of said rectangular bag also has a set of semicircular moldings separated by respective tubes that are used to attach said rectangular bag to said rectangular body.

4. The anti-theft luggage rack of claim 3 wherein the rigid tubular handles of said saddlebags are used to attach said saddlebags to said rectangular body.

* * * * *